April 16, 1963 W. J. C. M. BAZELMANS Re. 25,370

DEVICES FOR REMOVING CREASES FROM INDIVIDUAL PIECES OF FABRIC BY MEANS OF A CURRENT OF AIR

Original Filed Oct. 28, 1958

INVENTOR

WILHELMUS J. C. M. BAZELMANS

BY Robert H. Burns

ATTORNEY

United States Patent Office

Re. 25,370
Reissued Apr. 16, 1963

25,370

DEVICES FOR REMOVING CREASES FROM INDIVIDUAL PIECES OF FABRIC BY MEANS OF A CURRENT OF AIR

Wilhelmus J. C. M. Bazelmans, 122 Providencialweg, Meerveldhoven, Netherlands

Original No. 2,976,625, dated Mar. 28, 1961, Ser. No. 770,134, Oct. 28, 1958. Application for reissue Mar. 6, 1962, Ser. No. 179,282
Claims priority, application Netherlands Nov. 1, 1957
10 Claims. (Cl. 38—2)

Figure 1:
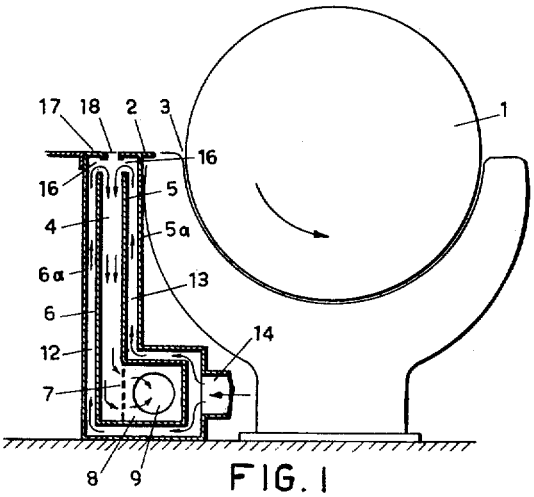

Matter enclosed in heavy brackets [ ] appears in the original patent but forms no part of this reissue specification; matter printed in italics indicates the additions made by reissue.

The invention relates to a device for removing creases from or straightening individual pieces of fabric, such as sheets, by means of a current of air before said pieces of fabric are fed into an apparatus for handling them, e.g. a mangle.

The feeding of pieces of laundry, e.g. sheets, towels or other pieces of cloth, into a mangle must be carried out very carefully, since these pieces of fabric must be fed into the mangle completely free from wrinkles, creases or overfolds. Therefore it is necessary that the pieces of fabric are continuously smoothed out by hand just before they are drawn into the mangle. This fact decreases the velocity of the mangling process and requires skilled operators.

It has already been tried to straighten, stretch or spread said pieces of fabric with the aid of rotating brushes mounted in front of the inlet opening of the mangle. Such brushes did not give reliable results. It has also been proposed to smooth out the pieces of laundry or the cloth to be fed into the apparatus by means of a current of air. However, the known devices of this type are very complicated and expensive.

The invention has for its object to provide a device for straightening, stretching or spreading pieces of laundry, cloth or like pieces of fabric by means of a current of air, which device has a particularly simple construction. It consists in the provision of a well or shaft opening in front of the inlet opening of the apparatus for handling said cloth or pieces of fabric and a device for the production in said shaft of a current of air directed away from said inlet opening.

If the apparatus is a mangle for ironing pieces of laundry, e.g. sheets, towels, etc. and if said mangle is provided with a straightening plate or bar mounted in front of its inlet opening said straightening plate or bar may at the same time form the upper rear edge of a narrow vertical shaft, which is open at its upper end and is connected at or near its lower end to a suction conduit. When with the aid of this device say a sheet must be ironed, said sheet is brought with a marginal portion into the mangle or the feeding members thereof while the suction conduit is closed and the sheet is drawn over the upper opening of the shaft or pushed into the latter. If thereupon the suction conduit is opened the sheet is sucked down into the shaft. It has now appeared that said sheet is stretched and completely smoothed out over the edge of the straightening plate or bar and that at the same time the current of air sweeping past said sheet prevents the forming of new or fresh creases or overfolds in the sheet during its movement due to the mangling operation.

It has appeared to be advantageous to provide the shaft near its upper edge with an inlet aperture in one or each of its two long vertical walls and to connect said inlet aperture to a pressure conduit. It is also possible to so construct the shaft as to bound one or each of its long sides by two spaced apart walls and to connect the space between the or each pair of said walls to the pressure side of a fan. If desired, valves may be provided, which are adapted to open and to close the or each inlet aperture for admitting compressed air into the shaft.

For the elucidation reference is made to the accompanying drawing, which illustrates by way of example an embodiment of the invention. In the drawings are:

FIG. 1 an elevational sectional view, and

Figure 2:
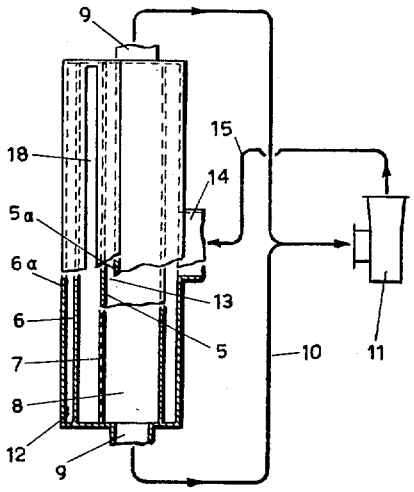

FIG. 2 partly a cross-sectional view and partly a plan view.

In the drawing 1 designates a mangle having in front of its inlet opening 3 a so-called straightening plate or bar 2. Mounted in front of and below said straightening plate is a vertical tube-shaped well or shaft 4 having double long walls 5, 5a and 6, 6a. Said shaft 4 is open at its upper end and is connected near its lower end through a grid 7 to a space 8, which is connected at its lateral ends 9 to the suction conduit 10 of fan 11. The walls 5, 5a and the walls 6, 6a confine spaces 12, 13 which at 14 communicate with the pressure conduit 15 of said fan 11 and at their upper ends at 16 with the upper end of the shaft 4. The straightening plate 2 and a corresponding plate 17 or a roller (not shown) cover the spaces 12, 13 at their upper ends. A slot 18 is left free between said parts 2 and 17.

A sheet to be ironed by the mangle 1 is fed with its front edge into feeding members (not shown), which move the sheet toward the inlet opening 3 of the mangle. The rest of the sheet is pushed or sucked into the shaft 4 through the slot 18. The current of air produced in the shaft 4 pulls the sheet downward in such a manner that present creases or overfolds are straightened or stretched before said creases or overfolds reach the edge of the straightening plate 2 during the movement of the sheet.

It is not necessary that compressed air is supplied through two spaces 12, 13. Also the supply of compressed air from one side gives excellent results. In many cases it suffices to connect the shaft 4 only to the suction conduit of the fan, so that air from the outside is sucked in at the upper end of the shaft. The temporary checking of the current of compressed air may also be effected in other places of the circuit of the current of air.

What I claim is:

1. In combination with a mangle, a device for smoothing laundered articles, said device comprising a box-like outer container having a horizontally extended base and a vertically extended narrow upper section, said upper section having a top with a long, narrow inlet-outlet opening for the insertion of a laundered article except for an edge of said article which is led to said mangle, an inner box-like container similar in shape to said outer box-like container, said inner container having its upper section open at the top to receive said part of article inserted in the inlet-outlet opening of said outer container, and an air moving means connected to said inner container and adapted to move air down said vertical upper section of said inner container, said air moving in the opposite direction to that in which said article moves, out through said inlet-outlet opening to said mangle, whereby said laundered article is stretched and smoothed by said passage of air.

2. A device as claimed in claim 1 in which said inner container is arranged in said outer container so as to leave a free airway between said containers, said airway opening into the upper end of said inner container.

3. A device as claimed in claim 2 in which the air moving means is a fan having a pressure end and a suction end, said pressure end being connected to said horizontal base section of said outer container and said suction end being connected to said horizontal base section of said inner container.

4. A device as claimed in claim 1 in which the horizontal top of said outer container's upper section has a straightening plate intermediate said inlet-outlet opening and said mangle, said articles being drawn over said straightening plate to the mangle and against the opposing force of the air movement in said article in said inner container.

5. In combination with apparatus for processing sheets of fabric, said apparatus having a base portion adapted to rest on a floor, an elongated horizontally extending fabric receiving surface disposed a substantial distance above the floor and feeding means adapted to engage initially an edge of a sheet of fabric and draw said sheet progressively over said receiving surface and into said apparatus, a fabric straightening device comprising wall means defining a hollow vertically extending well terminating at its upper end in a narrow elongated opening disposed adjacent to and in front of said fabric receiving surface at substantially the same elevation as said surface and extending substantially the full length of said surface, said opening being open directly to the atmosphere, said well extending downwardly from said opening substantially to the floor and having an air discharge outlet at its lower end, and air moving means communicating with said discharge outlet and operative to draw atmospheric air into said well through said opening and down through said well and thereby draw the unengaged portion of said fabric sheet down into said well so as to hang freely down in said well, the flow of air down through said well causing said unengaged portion of the fabric to flutter and shake in said well, thereby shaking out wrinkles and straightening the unengaged portion of said fabric as it is drawn up out of said well and into said apparatus by said feeding means.

6. In combination with apparatus for processing sheets of fabric, said apparatus having elongated horizontally extending fabric receiving surface and feeding means adapted to engage initially an edge of a sheet of fabric and draw said sheet progressively over said receiving surface and into said apparatus, a fabric straightening device comprising means defining a narrow elongated opening disposed adjacent to and in front of said fabric receiving surface substantially the same level as said surface and extending substantially the full length of said surface, said opening defining means comprising a straightening lip, wall means defining a deep well extending downwardly from said opening and having an air discharge outlet at its lower portion, said opening at the upper end of said well being open directly to the atmosphere, air exhaust means connected with said outlet to draw atmospheric air in said opening and down through said well and thereby draw the unengaged portion of said fabric sheet down into said well so as to hang freely down in said well, said feeding means drawing said fabric sheet upwardly out of said well and over said lip, and means defining an air inlet into said well below said lip so that air is drawn down on opposite sides of said sheet to cause said sheet to flutter and shake in said well so as to shake out any folds or creases as it is drawn upwardly over said lip by said feeding means.

7. A fabric straightening device for use with a fabric ironing apparatus having fabric feeding means for engaging initially an edge of a piece of fabric and drawing said fabric progressively into said apparatus, said device comprising means defining a fabric straightening surface extending horizontally in front of said feeding means, and having a straight forward edge, wall means defining a vertically extending deep well terminating at its upper end in a narrow elongated opening disposed immediately in front of said straightening surface at substantially the same level as said surface and extending substantially the full length of said surface, said opening being open directly to the atmosphere, said well extending downwardly from said opening a distance at least several times the thickness of said well in a direction transverse to said opening and having an air discharge outlet in its lower portion, and air moving means communicating with said discharge outlet and operative to draw atmospheric air into said well through said opening and down through said shaft and thereby draw the unengaged portion of said fabric down into said well so as to hang freely in said well, the flow of air down through said well causing said unengaged portion of the fabric to flutter and shake in said well, thereby shaking out wrinkles as the fabric is drawn up out of said well and over said straightening surface by said feeding means.

8. In combination with fabric ironing apparatus having fabric feeding means for engaging initially an edge of a sheet of fabric and drawing said fabric progressively into said apparatus, means defining a first fabric guiding surface extending horizontally in front of said fabric feeding means and transversely to the direction of feed of the fabric, said surface terminating at its forward edge in a straight horizontally extending lip, means defining a second fabric guiding surface at approximately the same level as said first surface and spaced forwardly from said lip to define between said surfaces a narrow elongated opening, means defining a well extending downwardly from said opening and having a depth in a vertical direction at least several times its width in the direction of feed of said fabric, said well being directly open to the atmosphere at its upper end through said opening and having an air discharge outlet at its lower end, and suction means connected with said outlet at the lower end of said well to draw atmospheric air in through said opening and down through said well thereby causing an air stream to flow downwardly in said well, whereby a sheet of material fed over said guiding surfaces and across said opening to said feeding means and having its leading edge engaged by said feeding means is drawn down through said opening into said well by said suction means so that the unengaged portion of said sheet hangs freely down in said well, said feeding means progressively drawing said sheet up out of said well and over said lip and first guiding surface into said apparatus, and means defining an air inlet into said well below said lip so that air is drawn down on opposite sides of said sheet to cause said sheet to flutter and shake in said well as it is drawn up over said lip by said feeding means to shake out any folds or creases in the sheet.

*9. A fabric straightening device through which a length of fabric may be drawn prior to further processing, said device comprising walls defining a vertical well having a substantially oblong horizontal cross-section with a first pair of opposite elongated sides, said well terminating at its upper end in an elongated opening having a pair of opposite long sides extending lengthwise of said opening substantially parallel to said first-named sides and substantially throughout the entire length thereof, through which the fabric passes, said well extending downwardly from said opening to receive the fabric and to provide an air passage, an elongated straightening member adjacent said opening and extending in the lengthwise direction of said opening, over which fabric drawn from said well is passed to change its direction, said well having means defining an air outlet in its lower portion, and air moving*

*means communicating with said well and operative to cause air to flow into said well and downwardly therethrough past said moving fabric to straighten out wrinkles therein as the fabric is drawn up out of said well and over said straightening member.*

*10. A fabric straightening device as claimed in claim 9, comprising means defining the air inlet on the side of said well along which the straightening member extends and below the latter so that air can engage the side of said fabric while said fabric engages said member.*

References Cited in the file of this patent or the original patent

UNITED STATES PATENTS

| | | |
|---|---|---|
| 1,170,551 | Marty | Feb. 8, 1916 |
| 1,274,914 | McDevitt | Aug. 6, 1918 |
| 1,912,724 | Remington | June 6, 1933 |
| 1,997,267 | Remington | Apr. 9, 1935 |
| 2,242,144 | Runton | May 13, 1941 |
| 2,635,370 | Mann et al. | Apr. 21, 1953 |